(12) United States Patent
Perrin et al.

(10) Patent No.: US 9,858,210 B2
(45) Date of Patent: Jan. 2, 2018

(54) INFORMATION PROCESSING APPARATUS, RENDERING APPARATUS, METHOD AND PROGRAM

(71) Applicant: SQUARE ENIX HOLDINGS CO., LTD., Tokyo (JP)

(72) Inventors: Cyril Perrin, Antony (FR); Alex Tait, Montreal (CA)

(73) Assignee: SQUARE ENIX HOLDINGS CO., LTD., Tokyo (JP)

( * ) Notice: Subject to any disclaimer, the term of this patent is extended or adjusted under 35 U.S.C. 154(b) by 42 days.

(21) Appl. No.: 14/655,807

(22) PCT Filed: Feb. 28, 2014

(86) PCT No.: PCT/JP2014/055886
§ 371 (c)(1),
(2) Date: Jun. 26, 2015

(87) PCT Pub. No.: WO2014/136920
PCT Pub. Date: Sep. 12, 2014

(65) Prior Publication Data
US 2015/0331813 A1    Nov. 19, 2015

Related U.S. Application Data

(60) Provisional application No. 61/772,690, filed on Mar. 5, 2013.

(51) Int. Cl.
G06F 13/00    (2006.01)
G06T 11/00    (2006.01)
(Continued)

(52) U.S. Cl.
CPC ............ *G06F 13/00* (2013.01); *A63F 13/355* (2014.09); *A63F 13/5255* (2014.09);
(Continued)

(58) Field of Classification Search
CPC .............. G07F 17/326; G07F 17/3272; G07F 17/3239; A63F 13/86; A63F 13/30;
(Continued)

(56) References Cited

U.S. PATENT DOCUMENTS

2003/0038805 A1    2/2003    Wong et al.
2003/0218615 A1    11/2003    Gelb
(Continued)

FOREIGN PATENT DOCUMENTS

JP    2008-245987    10/2008
JP    2009-223650    10/2009

OTHER PUBLICATIONS

International Search Report (ISR) of International Patent Application No. PCT/JP2014/055886, dated Jun. 10, 2014.
(Continued)

*Primary Examiner* — Sultana M Zalalee
(74) *Attorney, Agent, or Firm* — Greenblum & Bernstein, P.L.C.

(57) ABSTRACT

An information processing apparatus obtains information of an operation input made on a first client device from that the first client device, and generates a first rendering command for a first screen to be provided to the first client device based on information of the operation input. The apparatus also obtains change information, for changing a display state of a rendering object, from a second client device, and generates a second rendering command for a second screen by changing the first rendering command based on the change information.

7 Claims, 11 Drawing Sheets

(51) Int. Cl.
  *G06T 15/00*    (2011.01)
  *A63F 13/355*   (2014.01)
  *H04L 29/06*    (2006.01)
  *A63F 13/5255*  (2014.01)
  *A63F 13/86*    (2014.01)
  *G06F 3/038*    (2013.01)
  *H04N 21/2343*  (2011.01)
  *H04N 21/41*    (2011.01)

(52) U.S. Cl.
  CPC .............. *A63F 13/86* (2014.09); *G06F 3/038* (2013.01); *G06T 11/00* (2013.01); *G06T 15/005* (2013.01); *H04L 65/4084* (2013.01); *H04L 67/38* (2013.01); *H04N 21/234318* (2013.01); *H04N 21/4126* (2013.01); *G06F 2203/0383* (2013.01)

(58) Field of Classification Search
  CPC ...... A63F 13/355; A63F 13/00; A63F 13/822; A63F 2300/577; A63F 13/40; A63F 13/69; A63F 2300/538; A63F 2300/5533; H04N 21/4781; H04N 21/2353
  See application file for complete search history.

(56) References Cited

U.S. PATENT DOCUMENTS

2011/0157196 A1* 6/2011 Nave .................... G06F 9/4445
                                                    345/522
2012/0004040 A1* 1/2012 Pereira .................. A63F 13/77
                                                    463/42

OTHER PUBLICATIONS

Agoston, Max K., "Computer Graphics and Geometric Modeling: Implementation and Algorithms", Springer-Verlag London Limited, pp. 1-907 (2005).

European Search Report from European Patent Office (EPO) in European Patent Appl. No. 14760603.2, dated Sep. 27, 2016.

* cited by examiner

INFORMATION PROCESSING APPARATUS, RENDERING APPARATUS, METHOD AND PROGRAM

CLAIM FOR PRIORITY

This application is a U.S. National Stage of PCT/JP2014/055886 filed on Feb. 28, 2014, and claims the priority benefit of U.S. provisional application 61/772,690, filed Mar. 5, 2013, the contents of which is expressly incorporated by reference herein in their entireties.

TECHNICAL FIELD

The present invention pertains generally to cloud-based video games and, in particular, provides an information processing apparatus, a rendering apparatus, a method and a program for allowing a spectator to confirm that the gameplay being spectated is occurring in real-time.

BACKGROUND ART

The video game industry has seen considerable evolution, from the introduction of stand-alone arcade games, to home-based computer games, to the emergence of games made for specialized consoles. Democratization of the Internet then enabled the next major development, namely "cloud gaming". In a cloud gaming system, a player can utilize an ordinary Internet-enabled appliance such as a smartphone or tablet to connect to a video game server over the Internet. The video game server starts a session for the player, and may do so for multiple players. The video game server renders images and generates audio for the player based on player actions (e.g., moves, selections) and other attributes of the game. Encoded video and audio is delivered to the player's device over the Internet, and is reproduced as visible images and audible sounds. In this way, players from anywhere in the world can play a video game without the use of specialized video game consoles, software or graphics processing hardware.

In cases where screens generated by rendering processing on a server side are provided to a player's device in this way, after the generated screens are encoded as moving images, the moving images are transmitted in a streaming format as with a general moving image viewing site. In other words, it is possible to simultaneously transmit a moving image generated in accordance with operation input from a player's device to a number of devices as with a moving image viewing site. Because, with such a configuration, one player is able to provide another user with game screens played on the device of the player, the other user is able to view (spectate) the state of play of the player on his or her own device, for example.

Recently, demand has been growing for so called "play-by-play" moving images where screens of a game that one player plays on an offline home use game console, for example, are recorded while being interpreted, and distributed by a moving image viewing site, or the like. Regarding systems for performing rendering of game screens on a server side, and for generating corresponding coded moving image data, such as those for cloud gaming, a spectating function as described above can be considered to satisfy demands of a user and a player because not only able to distribute moving image data simply, but it is able to distribute the playing of the game by the player around the same time.

However, in cases where screens obtained by rendering graphics, not limited to game screens, for one device on a server side are provided to the device and to another device in this way, there is the possibility that a user of another device will not be in a desired display state. For example, for a GUI in a screen, a user performing operation is able to change to a suitable layout, color, or the like, but on a device only receiving the screens, and performing display, the user was not able to change the layout, the color, or the like.

SUMMARY OF INVENTION

The present invention was made in view of such problems in the conventional technique. The present invention provides a technique for suitably changing a display state of a screen rendered based on an operation on another device.

The present invention in its first aspect provides an information processing apparatus that generates a rendering command for a screen to be provided to a plurality of client devices, the apparatus comprising: first obtaining means for obtaining information of an operation input made on a first client device from that the first client device; first generation means for generating a first rendering command for a first screen to be provided to the first client device based on information of the operation input; second obtaining means for obtaining change information, for changing a display state of a rendering object, from a second client device, a second screen changed based on information of the operation input being provided to the second client device; and second generation means for generating a second rendering command for the second screen by changing the first rendering command based on the change information.

The present invention in its second aspect provides a rendering apparatus comprising: rendering means for generating a screen using rendering commands generated by the information processing apparatus, the rendering apparatus comprising: first transmission means for transmitting, to a first client device, a first screen generated based on the first rendering command; and second transmission means for transmitting, to a second client device, a second screen is generated based on the second rendering command.

The present invention in its third aspect provides a method of controlling an information processing apparatus that generates a rendering command for a screen to be provided to a plurality of client devices, the method comprising: a first obtaining step of obtaining information of an operation input made on a first client device from that the first client device; a first generation step of generating a first rendering command for a first screen to be provided to the first client device based on information of the operation input; a second obtaining step of obtaining change information, for changing a display state of a rendering object, from a second client device, a second screen changed based on information of the operation input being provided to the second client device; and a second generation step of generating a second rendering command for a second screen to be provided to the second client device by changing the first rendering command based on the change information.

The present invention in its fourth aspect provides a program for causing one or more computers to execute a method of generating a rendering command for a screen to be provided to a plurality of client devices, the method comprising: a first obtaining step of obtaining information of an operation input made on a first client device from that the first client device; a first generation step of generating a first rendering command for a first screen to be provided to the first client device based on information of the operation input; a second obtaining step of obtaining change information, for changing a display state of a rendering object, from a second client device, a second screen changed based on information of the operation input being provided to the second client device; and a second generation step of generating a second rendering command for a second screen to be provided to the second client device by changing the first rendering command based on the change information.

Further features of the present invention will become apparent from the following description of exemplary embodiments (with reference to the attached drawings).

DESCRIPTION OF EMBODIMENTS

I. Cloud Gaming Architecture

Figure 1:
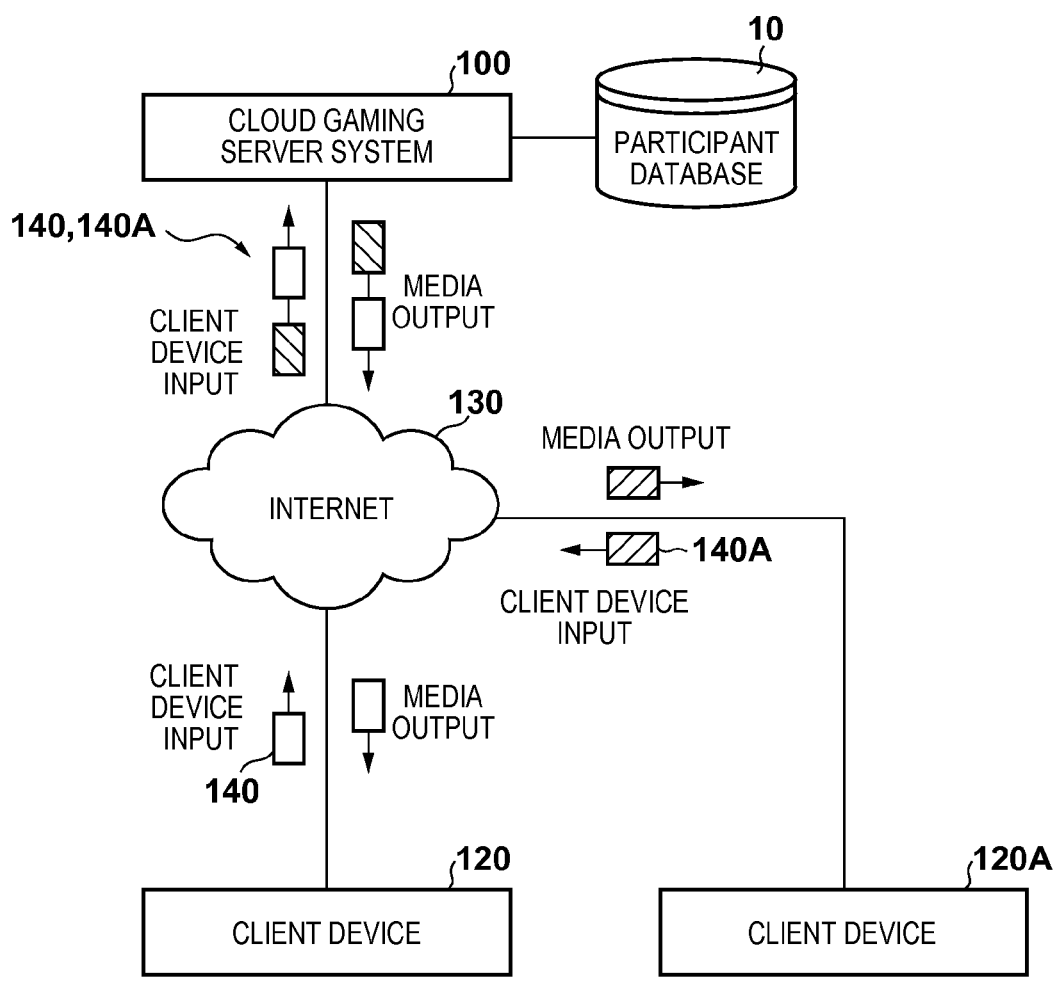
FIG. 1 is a block diagram of a cloud-based video game system architecture, according to a non-limiting embodiment of the present invention.

FIG. 1 schematically shows a cloud-based video game system architecture according to a non-limiting embodiment of the present invention. The architecture includes a plurality of client devices 120, 120A connected to a cloud gaming server system 100 over the Internet 130. Each of the client devices 120, 120A may connect to the Internet 130 in any suitable manner, including over a respective local access network (not shown). The cloud gaming server system 100 may also connect to the Internet 130 over a local access network (not shown), although the server system 100 may connect directly to the Internet 130 without the intermediary of a local access network. Connections between the cloud gaming server system 100 and one or more of the client devices 120, 120A may comprise one or more channels. These channels can be made up of physical and/or logical links, and may travel over a variety of physical media, including radio frequency, fiber optic, free-space optical, coaxial and twisted pair. The channels may abide by a protocol such as UDP or TCP/IP. Also, one or more of the channels may be supported a virtual private network (VPN). In some embodiments, one or more of the connections may be session-based.

The cloud gaming server system 100 enables users of the client devices 120, 120A to play video games, either individually (i.e., a single-player video game) or in groups (i.e., a multiplayer video game). Non-limiting examples of video games may include games that are played for leisure, education and/or sport. A video game may but need not offer participants the possibility of monetary gain. Although only two client devices 120, 120A are shown, it should be appreciated that the number of client devices in the cloud-based video game system architecture is not particularly limited.

A user of one of the client devices 120, 120A may register with the cloud gaming server system 100 as a participant in a video game. The user may register as a "player", and will have the opportunity to control a character, avatar, race car, cockpit, etc. within a virtual world maintained by the video game. In the case of a multi-player video game, the virtual world is shared by two or more players, and one player's gameplay may affect that of another. In some embodiments, a user of one of the client devices 120, 120A may register as a non-player "spectator", whereby such users will observe players' gameplay but otherwise do not control active characters in the game. Unless otherwise indicated, where the term "participant" is used, it is meant to apply equally to players and spectators.

Parameters related to various players and spectators can be stored in a participant database 10, which can be part of the cloud gaming server system 100 or situated remotely therefrom.

The configuration of any given one of the client devices 120, 120A is not particularly limited. In some embodiments, one or more of the client devices 120, 120A may be, for example, a personal computer (PC), a home game machine (console such as XBOX™, PS3™, Wii™, etc.), a portable game machine, a smart television, a set-top box (STB), etc. In other embodiments, one or more of the client devices 120, 120A may be a communication or computing device such as a mobile phone, a personal digital assistant (PDA), or a tablet.

Any given one of the client devices 120, 120A may be equipped with one or more input devices (such as a touch screen, a keyboard, a game controller, a joystick, etc.) to allow users of the given client device to provide input and participate in a video game. In other embodiments, the user may produce body motion or may wave an external object; these movements are detected by a camera or other sensor (e.g., Kinect™), while software operating within the given client device attempts to correctly guess whether the user intended to provide input to the given client device and, if so, the nature of such input. The given client device translates the received user inputs and detected user movements into "client device input", which is sent to the cloud gaming server system 100 over the Internet 130. In the illustrated embodiment, client device 120 produces client device input 140, while client device 120A produces client device input 140A.

The cloud gaming server system 100 processes the client device input 140, 140A received from the various client devices 120, 120A and generates "media output" for the various client devices 120, 120A. The media output may include encoded video (i.e., images) and audio (i.e., sound). The media output is sent over the Internet 130 in the form of packets. Packets destined for a particular one of the client devices 120, 120A may be addressed in such a way as to be routed to that device over the Internet 130. Each of the client devices 120, 120A may include circuitry for buffering and processing the media output in the packets received from the cloud gaming server system 100, as well as a display for displaying images and a transducer (e.g., a loudspeaker) for outputting audio. Additional output devices may also be provided, such as an electro-mechanical system to induce motion.

II. Cloud Gaming Server System 100 (Distributed Architecture)

Figure 2A:
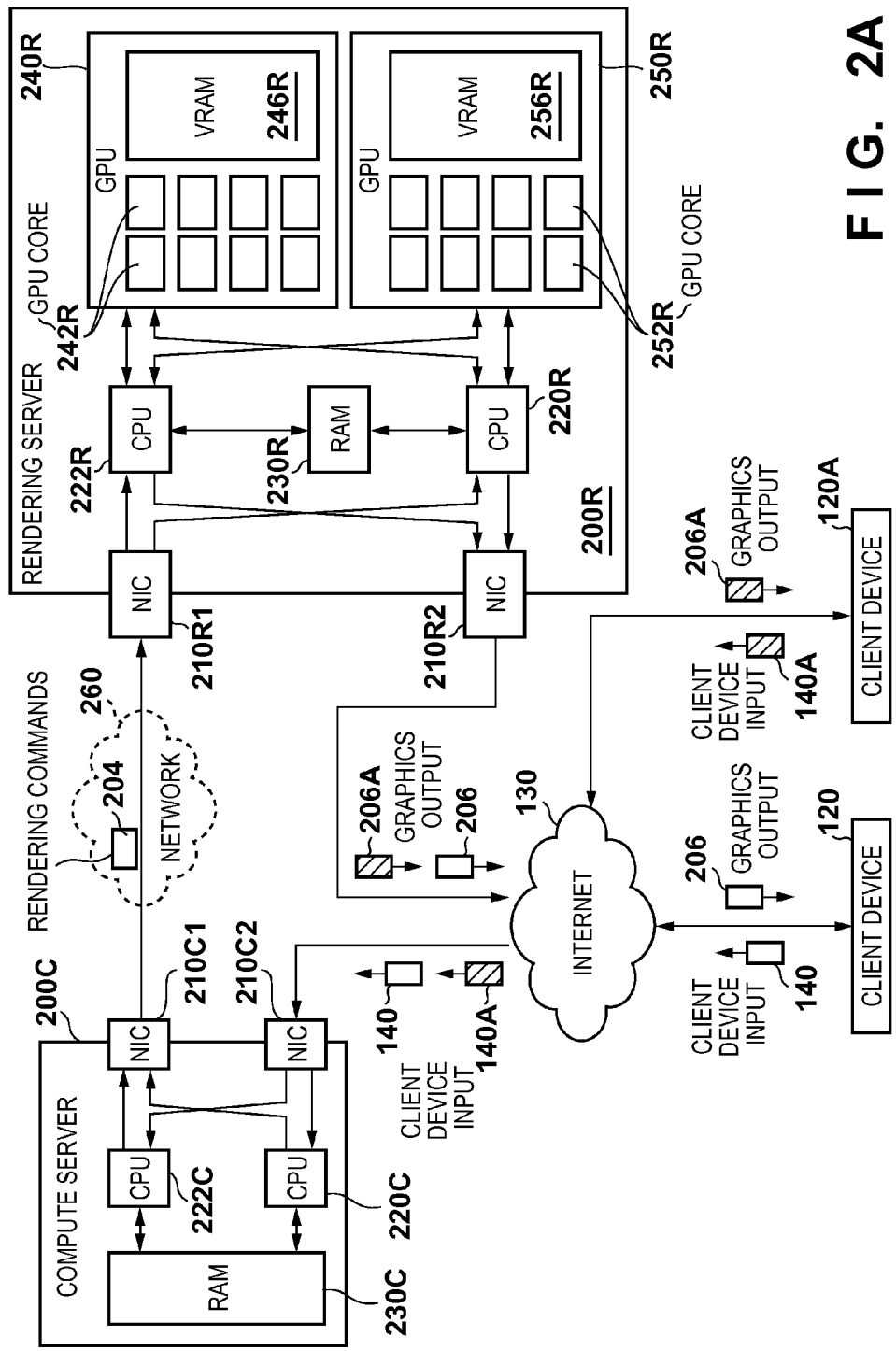
FIG. 2A is a block diagram showing various physical components of the architecture of FIG. 1, according to a non-limiting embodiment of the present invention.

FIG. 2A shows one possible non-limiting physical arrangement of components for the cloud gaming server system 100. In this embodiment, individual servers within the cloud gaming server system 100 are configured to carry out specialized functions. For example, a compute server 200C may be primarily responsible for tracking state changes in a video game based on user input, while a rendering server 200R may be primarily responsible for rendering graphics (images).

For the purposes of the presently described example embodiment, both client device 120 and client device 120A are assumed to be participating in the video game, either as players or spectators. However, it should be understood that in some cases there may be a single player and no spectator, while in other cases there may be multiple players and a single spectator, in still other cases there may be a single player and multiple spectators and in yet other cases there may be multiple players and multiple spectators.

For the sake of simplicity, the following description refers to a single compute server 200C connected to a single rendering server 200R. However, it should be appreciated that there may be more than one rendering server 200R connected to the same compute server 200C, or more than one compute server 200C connected to the same rendering server 200R. In the case where there are plural rendering servers 200R, these may be distributed over any suitable geographic area.

As shown in the non-limiting physical arrangement of components in FIG. 2A, the compute server 200C comprises one or more central processing units (CPUs) 220C, 222C and a random access memory (RAM) 230C. The CPUs 220C, 222C can have access to the RAM 230C over a communication bus architecture, for example. While only two CPUs 220C, 222C are shown, it should be appreciated that a greater number of CPUs, or only a single CPU, may be provided in some example implementations of the compute server 200C. The compute server 200C also comprises a network interface component (NIC) 210C2, where client device input is received over the Internet 130 from each of the client devices participating in the video game. In the presently described example embodiment, both client device 120 and client device 120A are assumed to be participating in the video game, and therefore the received client device input may include client device input 140 and client device input 140A.

The compute server 200C further comprises another network interface component (NIC) 210C1, which outputs a plurality of sets of rendering commands 204. The sets of rendering commands 204 output from the compute server 200C via the NIC 210C1 can be sent to the rendering server 200R. In one embodiment, the compute server 200C can be connected directly to the rendering server 200R. In another embodiment, the compute server 200C can be connected to the rendering server 200R over a network 260, which can be the Internet 130 or another network. A virtual private network (VPN) may be established between the compute server 200C and the rendering server 200R over the network 260.

At the rendering server 200R, the sets of rendering commands 204 sent by the compute server 200C are received at a network interface component (NIC) 210R1 and are directed to one or more CPUs 220R, 222R. The CPUs 220R, 222R are connected to a plurality of graphics processing units (GPUs) 240R, 250R. By way of non-limiting example, GPU 240R may include a set of GPU cores 242R and a video random access memory (VRAM) 246R. Similarly, GPU 250R may include a set of GPU cores 252R and a video random access memory (VRAM) 256R. Each of the CPUs 220R, 222R may be connected to each of the GPUs 240R, 250R or to a subset of the GPUs 240R, 250R. Communication between the CPUs 220R, 222R and the GPUs 240R, 250R can be established using, for example, a communications bus architecture. Although only two CPUs and two GPUs are shown, there may be more than two CPUs and GPUs, or even just a single CPU or GPU, in a specific example of implementation of the rendering server 200R.

The CPUs 220R, 222R cooperate with the GPUs 240R, 250R to convert the sets of rendering commands 204 into a plurality of graphics output streams for the participating client devices. In the present embodiment, there are two graphics output streams 206, 206A for the client devices 120, 120A, respectively. This will be described in further detail later on. The rendering server 200R comprises a further network interface component (NIC) 210R2, through which the graphics output streams 206, 206A are sent to the client devices 120, 120A, respectively.

III. Cloud Gaming Server System 100 (Hybrid Architecture)

Figure 2B:
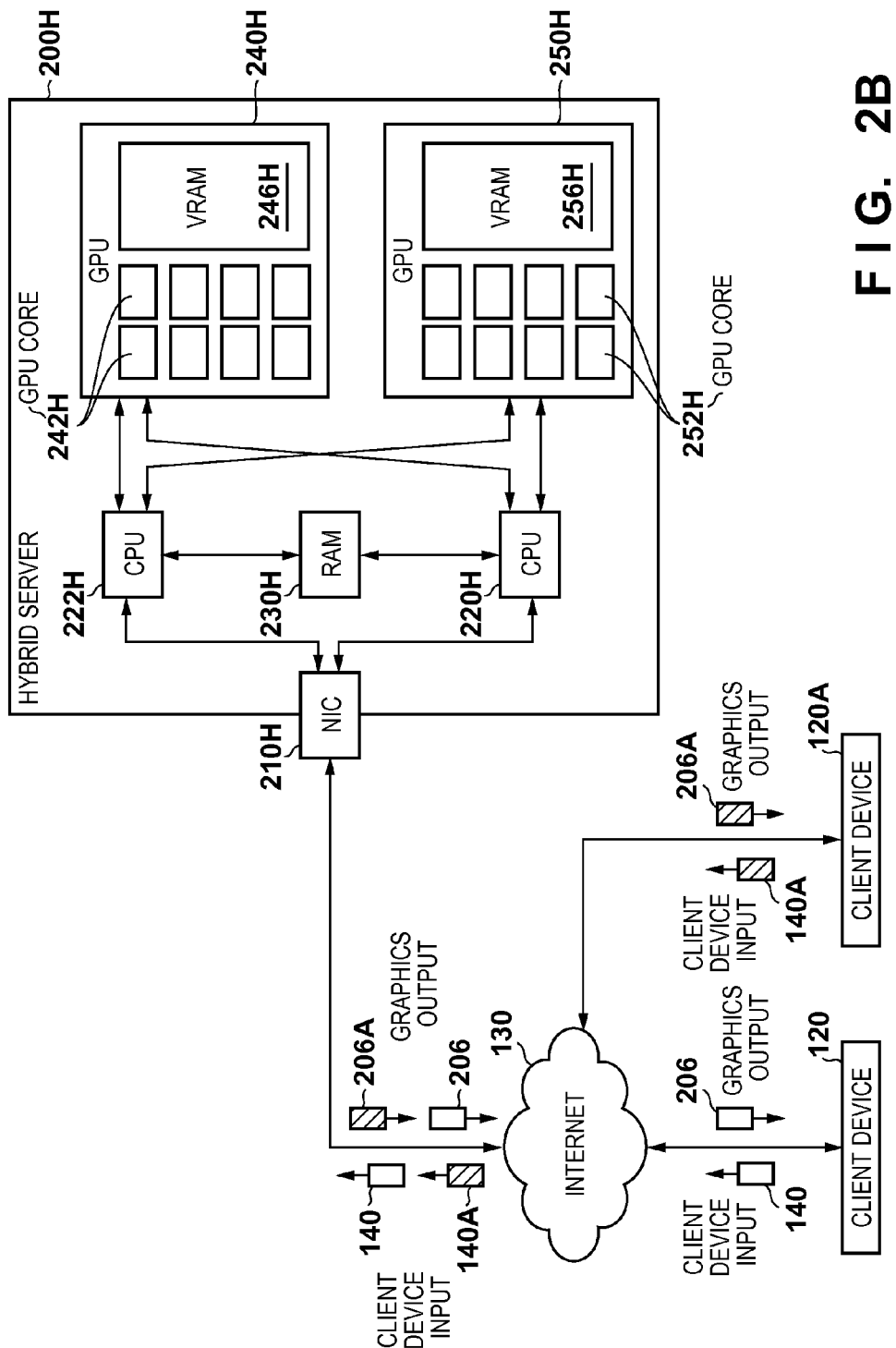
FIG. 2B is a variant of FIG. 2A.

FIG. 2B shows a second possible non-limiting physical arrangement of components for the cloud gaming server system 100. In this embodiment, a hybrid server 200H is responsible both for tracking state changes in a video game based on user input, and for rendering graphics (images).

As shown in the non-limiting physical arrangement of components in FIG. 2B, the hybrid server 200H comprises one or more central processing units (CPUs) 220H, 222H and a random access memory (RAM) 230H. The CPUs 220H, 222H can have access to the RAM 230H over a communication bus architecture, for example. While only two CPUs 220H, 222H are shown, it should be appreciated that a greater number of CPUs, or only a single CPU, may be provided in some example implementations of the hybrid server 200H. The hybrid server 200H also comprises a network interface component (NIC) 210H, where client device input is received over the Internet 130 from each of the client devices participating in the video game. In the presently described example embodiment, both client device 120 and client device 120A are assumed to be participating in the video game, and therefore the received client device input may include client device input 140 and client device input 140A.

In addition, the CPUs 220H, 222H are connected to a plurality of graphics processing units (GPUs) 240H, 250H.

By way of non-limiting example, GPU 240H may include a set of GPU cores 242H and a video random access memory (VRAM) 246H. Similarly, GPU 250H may include a set of GPU cores 252H and a video random access memory (VRAM) 256H. Each of the CPUs 220H, 222H may be connected to each of the GPUs 240H, 250H or to a subset of the GPUs 240H, 250H. Communication between the CPUs 220H, 222H and the GPUs 240H, 250H can be established using, for example, a communications bus architecture. Although only two CPUs and two GPUs are shown, there may be more than two CPUs and GPUs, or even just a single CPU or GPU, in a specific example of implementation of the hybrid server 200H.

The CPUs 220H, 222H cooperate with the GPUs 240H, 250H to convert the sets of rendering commands 204 into graphics output streams for the participating client devices. In this embodiment, there are two graphics output streams 206, 206A for the participating client devices 120, 120A, respectively. The graphics output streams 206, 206A are sent to the client devices 120, 120A, respectively, via the NIC 210H.

IV. Cloud Gaming Server System 100
(Functionality Overview)

Figure 2C:
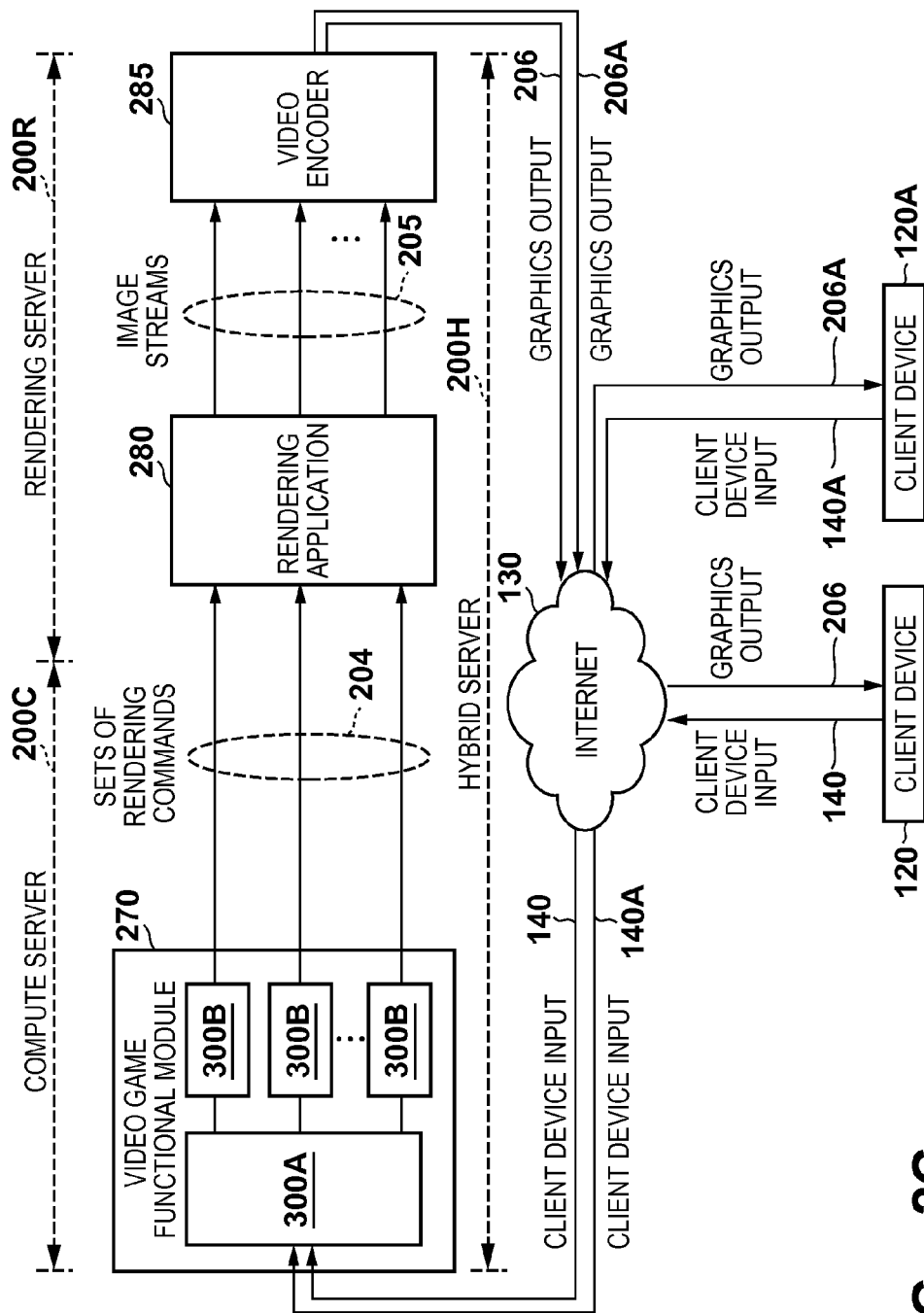
FIG. 2C is a block diagram showing various functional modules of the architecture of FIG. 1, which can be implemented by the physical components of FIG. 2A or 2B.

With additional reference now to FIG. 2C, the above-described physical components of the compute server 200C and the rendering server 200R (in FIG. 2A) and/or of the hybrid server 200H (in FIG. 2B) implement a set of functional modules, including a video game functional module 270, a rendering functional module 280 and a video encoder 285. According to the non-limiting embodiment of FIG. 2A, the video game functional module 270 is implemented by the compute server 200C, while the rendering functional module 280 and the video encoder 285 are implemented by the rendering server 200R. According to the non-limiting embodiment of FIG. 2B, the hybrid server 200H implements the video game functional module 270, the rendering functional module 280 and the video encoder 285.

The present example embodiment discusses a single video game functional module 270 for simplicity of illustration. However, it should be noted that in an actual implementation of the cloud gaming server system 100, many video game functional modules similar to the video game functional module 270 would be executed in parallel. Thus, the cloud gaming server system 100 could support multiple independent instantiations of the same video game, or multiple different video games, simultaneously. Also, it should be noted that the video games can be single-player video games or multi-player games of any type.

The video game functional module 270 may be implemented by certain physical components of the compute server 200C (in FIG. 2A) or of the hybrid server 200H (in FIG. 2B). Specifically, the video game functional module 270 can be encoded as computer-readable instructions that are executable by a CPU (such as the CPUs 220C, 222C in the compute server 200C or the CPUs 220H, 222H in the hybrid server 200H). The instructions can be tangibly stored in the RAM 230C (in the compute server 200C) of the RAM 230H (in the hybrid server 200H) or in another memory area, together with constants, variables and/or other data used by the video game functional module 270. In some embodiments, the video game functional module 270 may be executed within the environment of a virtual machine that may be supported by an operating system that is also being executed by a CPU (such as the CPUs 220C, 222C in the compute server 200C or the CPUs 220H, 222H in the hybrid server 200H).

The rendering functional module 280 may be implemented by certain physical components of the rendering server 200R (in FIG. 2A) or of the hybrid server 200H (in FIG. 2B). In an embodiment, the rendering functional module 280 may take up one or more GPUs (240R, 250R in FIG. 2A, 240H, 250H in FIG. 2B) and may or may not utilize CPU resources.

The video encoder 285 may be implemented by certain physical components of the rendering server 200R (in FIG. 2A) or of the hybrid server 200H (in FIG. 2B). Those skilled in the art will appreciate that there are various ways in which to implement the video encoder 285. In the embodiment of FIG. 2A, the video encoder 285 may be implemented by the CPUs 220R, 222R and/or by the GPUs 240R, 250R. In the embodiment of FIG. 2B, the video encoder 285 may be implemented by the CPUs 220H, 222H and/or by the GPUs 240H, 250H. In yet another embodiment, the video encoder 285 may be implemented by a separate encoder chip (not shown).

In operation, the video game functional module 270 produces the sets of rendering commands 204, based on received client device input. The received client device input may carry data (e.g., an address) identifying the video game functional module for which it is destined, as well as data identifying the user and/or client device from which it originates. Since the users of the client devices 120, 120A are participants in the video game (i.e., players or spectators), the received client device input includes the client device input 140, 140A received from the client devices 120, 120A.

Rendering commands refer to commands which can be used to instruct a specialized graphics processing unit (GPU) to produce an image or sequence of images. Referring to FIG. 2C, the sets of rendering commands 204 define images that are ultimately produced by the rendering functional module 280. These images change as a function of responses to the client device input 140, 140A that are programmed into the video game functional module 270. For example, the video game functional module 270 may be programmed in such a way as to respond to certain specific stimuli to provide the user with an experience of progression (with future interaction being made different, more challenging or more exciting), while the response to certain other specific stimuli will provide the user with an experience of regression or termination. Although the instructions for the video game functional module 270 may be fixed in the form of a binary executable file, the client device input 140, 140A is unknown until the moment of interaction with a player who uses the corresponding client device 120, 120A. As a result, there can be a wide variety of possible outcomes, depending on the specific client device input that is provided. This interaction between players/spectators and the video game functional module 270 via the client devices 120, 120A can be referred to as "gameplay" or "playing a video game".

The rendering functional module 280 processes the plural sets of rendering commands 204 to create a plurality of image streams 205. Generally, there will be one image stream 205 per participant (or, equivalently, per client device). When performing rendering, data for one or more objects represented in three-dimensional space (e.g., physical objects) or two-dimensional space (e.g., text) may be loaded into a cache memory (not shown) of a particular GPU 240R, 250R, 240H, 250H. This data may be transformed by the GPU 240R, 250R, 240H, 250H into a two-dimensional image, which may be stored in the appropriate VRAM 246R, 256R, 246H, 256H. As such, the VRAM 246R, 256R, 246H, 256H may provide temporary storage of picture element (pixel) values for a game screen.

The video encoder 285 compresses and encodes the images in each image stream 205 into streams of compressed video frames. The resultant streams of compressed video frames, referred to as graphics output streams, are produced on a per-client-device basis. In the present example embodiment, the video encoder 285 produces graphics output stream 206 for client device 120 and graphics output stream 206A for client device 120A. Additional functional modules may be provided for formatting the video frames into packets so that they can be transmitted over the Internet 130.

V. Generation of Rendering Commands

Figure 3A:
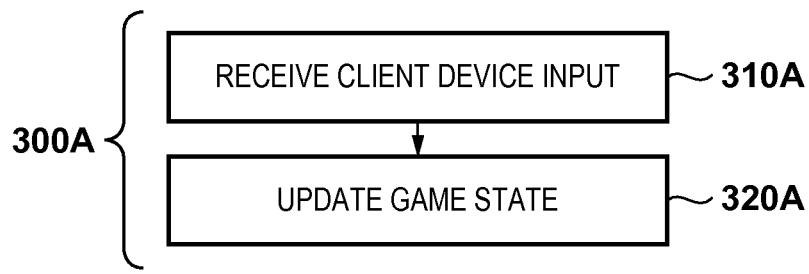
FIGS. 3A to 3C are flowcharts showing execution of a set of processes carried out during execution of a video game, in accordance with non-limiting embodiments of the present invention.
Figure 3B:
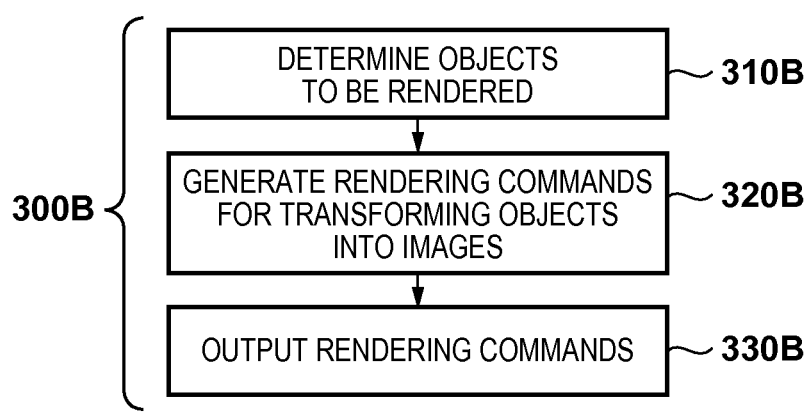

Generation of rendering commands by the video game functional module 270 is now described in greater detail with reference to FIGS. 2C, 3A and 3B. Specifically, execution of the video game functional module 270 involves several processes, including a main game process 300A and one or more graphics control processes 300B, which are described herein below in greater detail.

Main Game Process

A first process, referred to as the main game process, is described with reference to FIG. 3A. The main game process 300A executes continually. As part of the main game process 300A, there is provided a step 310A, during which client device input may be received. If the video game is a single-player video game without the possibility of spectating, then client device input (e.g., client device input 140) from a single client device (e.g., client device 120) is received as part of step 310A. If the video game is a multi-player video game or is a single-player video game with the possibility of spectating, then the client device input (e.g., the client device input 140 and 140A) from one or more client devices (e.g., the client devices 120 and 120A) may be received as part of step 310A.

By way of non-limiting example, the input from a given client device may convey that the user of the given client device wishes to cause a character under his or her control to move, jump, kick, turn, swing, pull, grab, etc. Alternatively or in addition, the input from the given client device may convey a menu selection made by the user of the given client device in order to change one or more audio, video or gameplay settings, to load/save a game or to create or join a network session. Alternatively or in addition, the input from the given client device may convey that the user of the given client device wishes to select a particular camera view (e.g., first-person or third-person) or reposition his or her viewpoint within the virtual world.

At step 320A, the game state may be updated based at least in part on the client device input received at step 310A and other parameters. Updating the game state may involve the following actions:

Firstly, updating the game state may involve updating certain properties of the participants (player or spectator) associated with the client devices from which the client device input may have been received. These properties may be stored in the participant database 10. Examples of participant properties that may be maintained in the participant database 10 and updated at step 320A can include a camera view selection (e.g., 1st person, 3rd person), a mode of play, a selected audio or video setting, a skill level, a customer grade (e.g., guest, premium, etc.).

Secondly, updating the game state may involve updating the attributes of certain objects in the virtual world based on an interpretation of the client device input. The objects whose attributes are to be updated may in some cases be represented by two- or three-dimensional models and may include playing characters, non-playing characters and other objects. In the case of a playing character, attributes that can be updated may include the object's position, strength, weapons/armor, lifetime left, special powers, speed/direction (velocity), animation, visual effects, energy, ammunition, etc. In the case of other objects (such as background, vegetation, buildings, vehicles, score board, etc.), attributes that can be updated may include the object's position, velocity, animation, damage/health, visual effects, textual content, etc.

It should be appreciated that parameters other than client device input can influence the above properties (of participants) and attributes (of virtual world objects). For example, various timers (such as elapsed time, time since a particular event, virtual time of day, total number of players, a participant's geographic location, etc.) can have an effect on various aspects of the game state.

Once the game state has been updated further to execution of step 320A, the main game process 300A returns to step 310A, whereupon new client device input received since the last pass through the main game process is gathered and processed.

Graphics Control Process

A second process, referred to as the graphics control process, is now described with reference to FIG. 3B. The graphics control process 300B may execute continually, and there may be a plurality separate graphics control processes 300B, each of which results in a respective one of the sets of rendering commands 204. In the case of a single-player video game without the possibility of spectating, there is only one player and therefore only one resulting set of rendering commands 204, and thus the graphics control process 300B may execute as an extension of the main game process 300A described above. In the case of a multi-player video game, multiple distinct sets of rendering commands need to be generated for the multiple players, and therefore multiple graphics control processes 300B may execute in parallel. In the case of a single-player game with the possibility of spectating, there may again be only a single set of rendering commands 204, and therefore a single graphics control process 300B may execute in the video game functional module 270, but the resulting image stream may be duplicated for the spectators by the rendering functional module 280. Of course, these are only examples of implementation and are not to be taken as limiting.

At step 310B of the graphics control process 300B for a given participant requiring a distinct image stream, the video game functional module 270 determines the objects to be rendered for the given participant. This step can include identifying the following types of objects:

Firstly, this step can include identifying those objects from the virtual world that are in the "game screen rendering range" (also known as a "scene") for the given participant. The game screen rendering range includes the portion of the virtual world that would be "visible" from the perspective of the given participant's camera. This depends on the position and orientation of that camera relative to the objects in the virtual world. In a non-limiting example of implementation of step 310B, a frustum can be applied to the virtual world, and the objects within that frustum are retained or marked. The frustum has an apex which is situated at the location of the given participant's camera and has a directionality also defined by the directionality of that camera.

Secondly, this step can include identifying additional objects that do not appear in the virtual world, but which nevertheless are to be rendered for the given participant. For example, these additional objects may include textual messages, graphical warnings and dashboard indicators, to name a few non-limiting possibilities.

At step 320B, the video game functional module 270 generates a set of commands for rendering into images the objects that were identified at step 310B. Rendering may refer to the transformation of 3-D or 2-D coordinates of an object or group of objects into a displayable image, in accordance with the viewing perspective and prevailing lighting conditions. This can be achieved using any number of different algorithms and techniques, for example as described in "Computer Graphics and Geometric Modelling: Implementation & Algorithms", Max K. Agoston, Springer-Verlag London Limited, 2005, hereby incorporated by reference herein.

At step 330B, the rendering commands generated at step 320B are output to the rendering functional module 280. This may involve packetizing the generated rendering commands into a set of rendering commands 204 that is sent to the rendering functional module 280.

Those skilled in the art will appreciate that multiple instantiations of the graphics control process 300B described above may be executed, resulting in multiple sets of rendering commands 204.

VI. Generation of Graphics Output

The rendering functional module 280 interprets the plural sets of rendering commands 204 and produces a plural set of image streams 205, one for each participating client device. Rendering may be achieved by the GPUs 240R, 250R, 240H, 250H under control of the CPUs 220R, 222R (in FIG. 2A) or 220H, 222H (in FIG. 2B). The rate at which images are produced for a participating client device may be referred to as the frame rate.

In an embodiment where there are N participants, there may be N sets of rendering commands 204 (one for each participant) and also N image streams 205 (one for each participant). In that case, rendering functionality is not shared among the participants. However, the N image streams 205 may also be created from M sets of rendering commands 204 (where M<N), such that fewer sets of rendering commands need to be processed by the rendering functional module 280. In that case, the rendering functional unit 280 may perform sharing or duplication in order to generate a larger number of image streams 205 from a smaller number of sets of rendering commands 204. Such sharing or duplication may be prevalent when multiple participants (e.g., spectators) desire to view the same camera perspective. Thus, the rendering functional module 280 may perform functions such as duplicating a created image stream for one or more spectators.

Next, the images in each of the image streams 205 are encoded by the video encoder 285, resulting in a sequence of encoded images associated with each client device, referred to as a graphics output stream. In the example embodiments of FIGS. 2A-2C, the sequence of encoded images destined for client device 120 is referred to as graphics output stream 206, while the sequence of encoded images destined for client device 120A is referred to as graphics output stream 206A.

The video encoder 285 can be a device (or set of computer-readable instructions) that enables or carries out or defines a video compression or decompression algorithm for digital video. Video compression transforms an original stream of digital image data (expressed in terms of pixel locations, color values, etc.) into an output stream of digital image data that conveys substantially the same information but using fewer bits. Any suitable compression algorithm may be used. In addition to data compression, the encoding process used to encode a particular image may or may not apply cryptographic encryption.

The graphics output streams 206, 206A created in the above manner are sent over the Internet 130 to the respective client devices. By way of non-limiting example, the graphics output streams may be segmented and formatted into packets, each having a header and a payload. The header of a packet containing an image for a given participant may include a network address of the client device associated with the given participant, while the payload may include the image, in whole or in part. In a non-limiting embodiment, the identity and/or version of the compression algorithm used to encode a given image may be encoded in the content of one or more packets that convey the given image. Other methods of transmitting the encoded images will occur to those of skill in the art.

While the present description focuses on the rendering of individual 2-D images of a video frame, the present invention does not exclude the possibility of rendering and encoding multiple sets of 2-D images per frame to create a 3-D effect.

VII. Game Screen Reproduction at Client Device

Figure 4A:
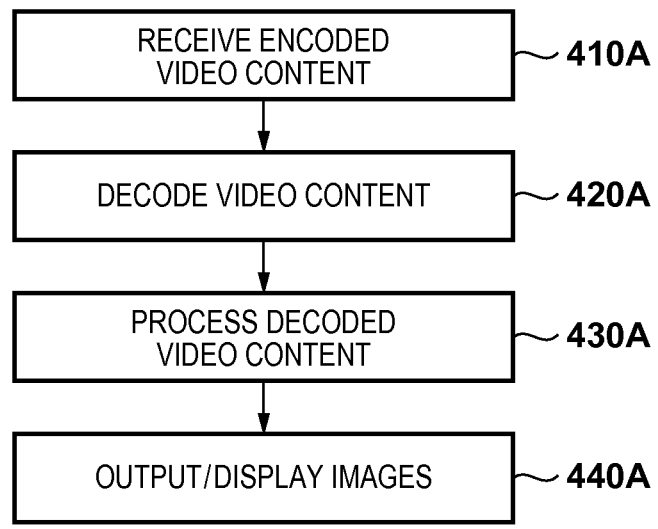
FIGS. 4A and 4B are flowcharts showing operation of a client device to process received video and audio, respectively, in accordance with non-limiting embodiments of the present invention.

Reference is now made to FIG. 4A, which shows operation of the client device associated with a given participant, which may be client device 120 or client device 120A, by way of non-limiting example.

At step 410A, encoded images (in one of the graphics output streams 206, 206A) are received over the Internet 130 from the rendering server 200R (FIG. 2A) or from the hybrid server 200H (FIG. 2B), depending on the embodiment.

At step 420A, the encoded images are decoded in accordance with the decompression algorithm that is complementary to the compression algorithm used in the encoding process. In a non-limiting embodiment, the identity or version of the compression algorithm used to encode the image may be known in advance. In other embodiments, the identity or version of the compression algorithm used to encode the image may be specified in the content of one or more packets that convey the image.

At step 430A, the (decoded) images are processed. This can include placing the decoded images in a buffer, performing error correction, reordering and/or combining multiple successive images, alpha blending, interpolating portions of missing images, and so on. The result can be a final image to be presented to the user on a per-frame basis.

At step 440A, the final image is output via the output mechanism of the client device. For example, a composite video frame can be displayed on the display of the client device.

VIII. Audio Generation

Figure 3C:
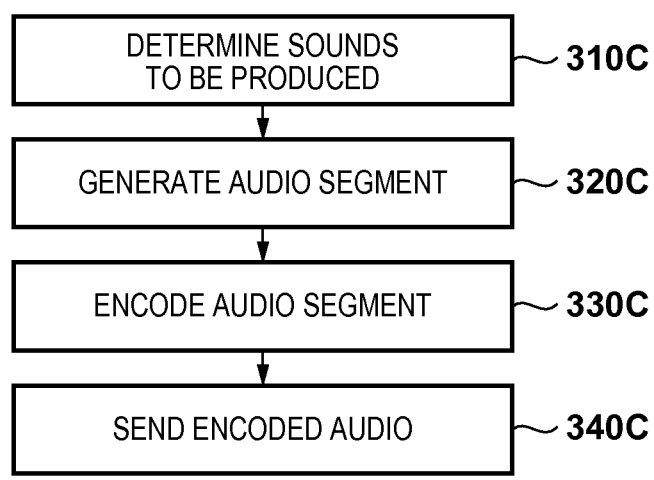

A third process, referred to as the audio generation process, is now described with reference to FIG. 3C. The audio generation process executes continually for each participant requiring a distinct audio stream. In one embodiment, the audio generation process may execute independently of the graphics control process 300B. In another embodiment, execution of the audio generation process and the graphics control process may be coordinated.

At step 310C, the video game functional module 270 determines the sounds to be produced. Specifically, this step can include identifying those sounds associated with objects in the virtual world that dominate the acoustic landscape, due to their volume (loudness) and/or proximity to the participant within the virtual world.

At step 320C, the video game functional module 270 generates an audio segment. The duration of the audio segment may span the duration of a video frame, although in some embodiments, audio segments may be generated less frequently than video frames, while in other embodiments, audio segments may be generated more frequently than video frames.

At step 330C, the audio segment is encoded, e.g., by an audio encoder, resulting in an encoded audio segment. The audio encoder can be a device (or set of instructions) that enables or carries out or defines an audio compression or decompression algorithm. Audio compression transforms an original stream of digital audio (expressed as a sound wave changing in amplitude and phase over time) into an output stream of digital audio data that conveys substantially the same information but using fewer bits. Any suitable compression algorithm may be used. In addition to audio compression, the encoding process used to encode a particular audio segment may or may not apply cryptographic encryption.

It should be appreciated that in some embodiments, the audio segments may be generated by specialized hardware (e.g., a sound card) in either the compute server 200C (FIG. 2A) or the hybrid server 200H (FIG. 2B). In an alternative embodiment that may be applicable to the distributed arrangement of FIG. 2A, the audio segment may be parameterized into speech parameters (e.g., LPC parameters) by the video game functional module 270, and the speech parameters can be redistributed to the destination client device (e.g., client device 120 or client device 120A) by the rendering server 200R.

The encoded audio created in the above manner is sent over the Internet 130. By way of non-limiting example, the encoded audio input may be broken down and formatted into packets, each having a header and a payload. The header may carry an address of a client device associated with the participant for whom the audio generation process is being executed, while the payload may include the encoded audio. In a non-limiting embodiment, the identity and/or version of the compression algorithm used to encode a given audio segment may be encoded in the content of one or more packets that convey the given segment. Other methods of transmitting the encoded audio will occur to those of skill in the art.

Figure 4B:
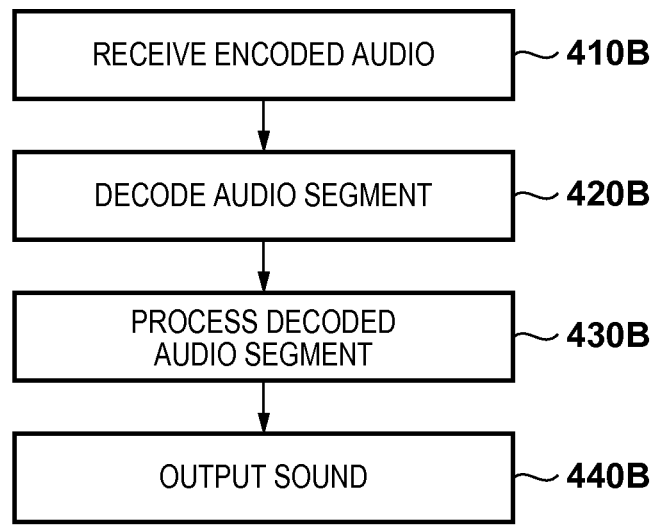

Reference is now made to FIG. 4B, which shows operation of the client device associated with a given participant, which may be client device 120 or client device 120A, by way of non-limiting example.

At step 410B, an encoded audio segment is received from the compute server 200C, the rendering server 200R or the hybrid server 200H (depending on the embodiment). At step 420B, the encoded audio is decoded in accordance with the decompression algorithm that is complementary to the compression algorithm used in the encoding process. In a non-limiting embodiment, the identity or version of the compression algorithm used to encode the audio segment may be specified in the content of one or more packets that convey the audio segment.

At step 430B, the (decoded) audio segments are processed. This can include placing the decoded audio segments in a buffer, performing error correction, combining multiple successive waveforms, and so on. The result can be a final sound to be presented to the user on a per-frame basis.

At step 440B, the final generated sound is output via the output mechanism of the client device. For example, the sound is played through a sound card or loudspeaker of the client device.

IX. Specific Description of Non-Limiting Embodiments

Figure 6:
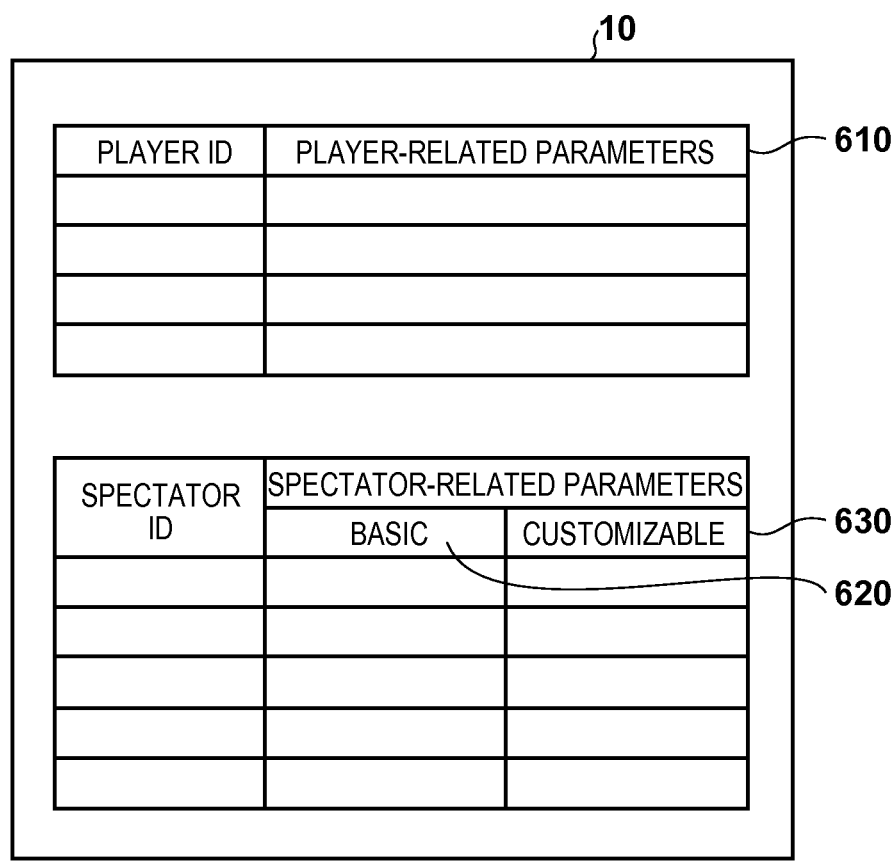
FIG. 6 is a view for showing various parameters managed by a participant database 10 according to embodiments of the present invention.

A more detailed description of certain non-limiting embodiments of the present invention is now provided. Firstly, however, it may be useful to provide additional details about the participant database 10, which was shown in FIG. 1 and is now described with further reference to FIG. 6. The participant database 10 stores parameters for each of the players (i.e., "player-related parameters" 610). Each player may have a player ID and the player-related parameters 610 can be organized according to player ID. The player-related parameters for a player having a given player ID may include data such as the IP address of the player's client device, the location of the player's client device, the player's account information, the player's subscription profile, the player's demographics (age, gender, income, etc.), etc.

In addition, the participant database 10 stores basic parameters for each of the spectators (i.e., "basic spectator-related parameters" 620). Each spectator may have a spectator ID and the basic spectator-related parameters 620 can be organized according to spectator ID. The basic spectator-related parameters for a spectator having a given spectator ID may include data such as the IP address of the spectator's client device, the location of the spectator's client device, the spectator's account information, the spectator's subscription profile, the spectator's demographics (age, gender, income, etc.), the player ID of the player that the spectator is spectating, etc.

Furthermore, the participant database 10 stores customizable display setting parameters for one or more of the spectators (i.e., "customizable spectator-related parameters" 630). In some embodiments, the customizable spectator-related parameters can include data representing a color, name or trademark. In other embodiments, the customizable spectator-related parameters can include a file representing a surface texture, which can be any kind of image, including a photograph, logo, etc. In still other embodiments, the customizable spectator-related parameters can include a video.

Figure 5:
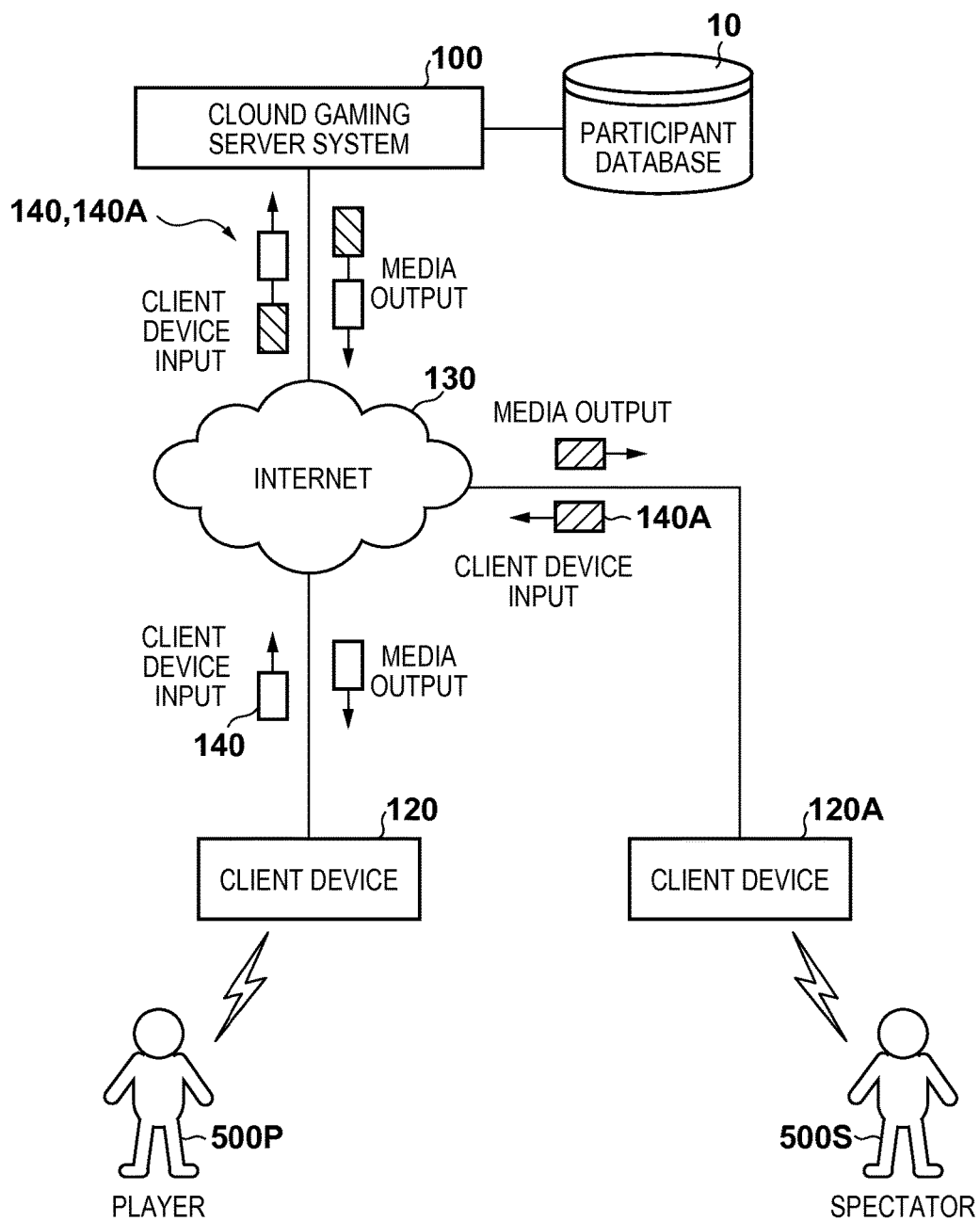
FIG. 5 is a block diagram of a cloud-based video game system architecture, according to an embodiment of the present invention.

Consider now an embodiment in which the video game enables spectating by a participant who registers as a spectator of the game. In this embodiment, and as shown in FIG. 5, a single player 500P and a single spectator 500S are assumed for the sake of example but it is to be understood that more than one player may play the video game and more than one spectator may spectate the video game. In the present embodiment, the player 500P is a user of client device 120 and the spectator 500S is a user of client device 120A.

Figure 7:
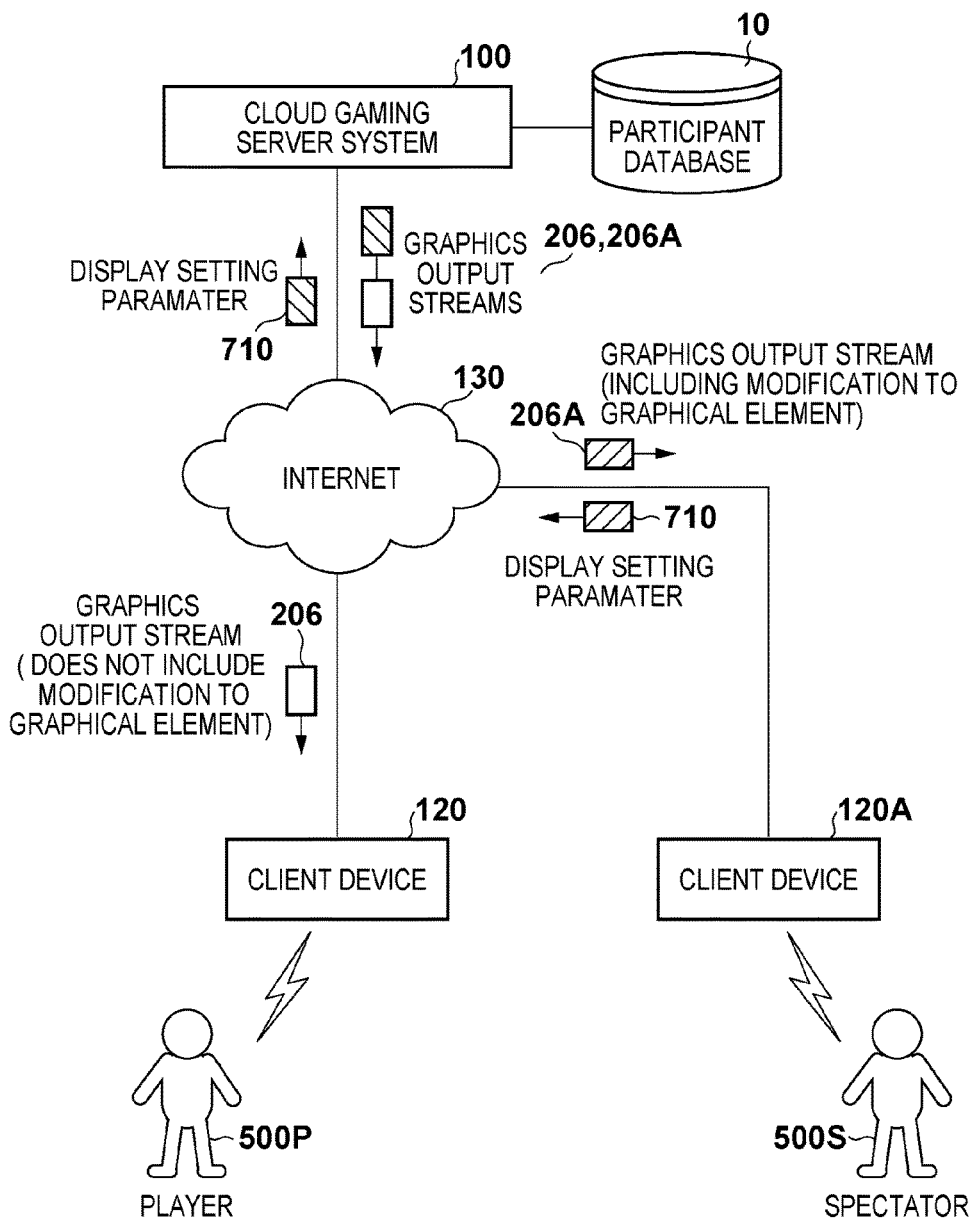
FIG. 7 is a view for showing details of data transmitted in the cloud-based video game system according to embodiments of the present invention.

With reference now to FIG. 7, the spectator 500S's client device 120A supplies a display setting parameter 710 to the cloud gaming server system 100. The display setting parameter 710 can be provided as part of client device input 140A from client device 120A. In accordance with embodiments of the present invention, the cloud gaming server system 100 responds by modifying one or more of the customizable spectator-related parameters 630 based on the display setting parameter 710. This results in a modification to a graphical feature (e.g., color, texture) of a particular object that appears in graphics output stream 206A provided to the spectator 500S but not in graphics output stream 206 provided to the player 500P. As a result, the player 500P is not distracted from the game, while the spectator 500S will be able to confirm, from observation of the images in graphics output stream 206A, that he/she is spectating real-time gameplay rather than a recording.

Embodiment

Figure 8:
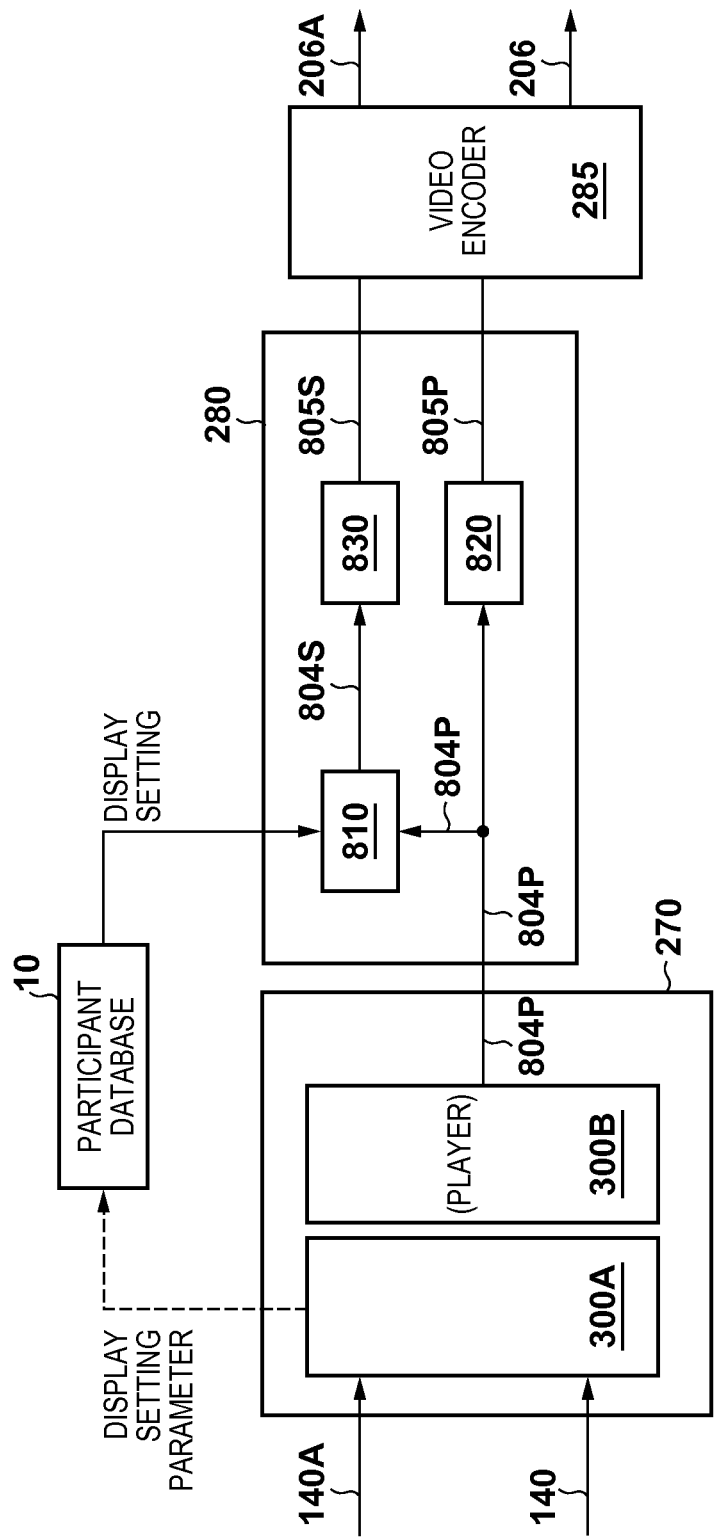
FIG. 8 is a view for showing generation of rendering commands by the video game functional module 270 and generation of graphics output streams 206, 206A by the rendering functional module 280.

To describe the embodiment, reference is made to FIG. 8, which conceptually illustrates generation of rendering commands by the video game functional module 270 and generation of graphics output streams 206, 206A by the rendering functional module 280.

Main Game Process

The video game functional module 270 executes the main game process, denoted 300A. The main game process 300A includes steps 310A and 320A, which were previously described with reference to FIG. 3A and are now described in the context of the embodiment involving the player 500P and the spectator 500S.

At step 310A, client device input may be received. In this case, it is recalled that client device 120 is a player device and client device 120A is a spectator device. The nature of the inputs 140, 140A received from these two types of client devices is different and is now explained.

In the case of the player 500P's client device 120, the client device input 140 may convey that the player 500P wishes to cause a character under his or her control to move, jump, kick, turn, swing, pull, grab, etc. Alternatively or in addition, client device input 140 may convey a menu selection made by the player 500P in order to change one or more audio, video or gameplay settings, to load/save a game or to create or join a network session. Alternatively or in addition, client device input 140 may convey that the player 500P wishes to select a particular camera view (e.g., first-person or third-person) or reposition his or her viewpoint within the virtual world.

In the case of the spectator 500S's client device 120A, the client device input 140A may convey a menu selection made by the spectator 500S in order to change one or more audio or video settings, to load/save a game or to create or join a network session. Additionally, for the case of the spectator 500S's client device 120A, client device input 140A may convey a display setting parameter 710. The display setting parameter 710 can include additional data for displaying set by the spectator 500S via client device 120A. Examples of additional data could be a particular color, textures, photograph, textual message, trademark, logo, web page address video or other personalized indicia. Also, the display setting parameter 710 may include information for changing a display state of a particular rendering object included in a spectated screen, i.e. a screen for a game being progressed by the operation of player 500P. Information for changing a display state of a rendering object may be information for changing a color, a texture, or the like as explained above, and may be something that determines a display position, a transparency, the existence or absence of display, the existence or absence of extra effects, or the like.

At step 320A, the game state may be updated based on the client device input 140 received at step 310A and other parameters. Updating the game state may involve the following actions:

Firstly, updating the game state may involve updating certain ones of the player-related parameters 610 based on the client device input 140. Examples of player-related parameters that may be maintained in the participant database 10 and updated at step 320A can include a camera view selection (e.g., 1st person, 3rd person), a mode of play, a selected audio or video setting, a skill level, a customer grade (e.g., guest, premium, etc.).

Additionally, updating the game state may involve updating the attributes of certain objects in the virtual world, based on an interpretation of the client device input 140. The objects whose attributes are to be updated may in some cases be represented by two- or three-dimensional models and may include playing characters, non-playing characters and other objects. In the case of a playing character, attributes that can be updated at step 320A may include the object's position, strength, weapons/armor, lifetime left, special powers, speed/direction (velocity), animation, visual effects, energy, ammunition, etc. In the case of other objects (such as background, vegetation, buildings, vehicles, score board, etc.), attributes that can be updated may include the object's position, velocity, animation, damage/health, visual effects, textual content, etc. The object models and their attributes may be stored in an object database (not shown).

It should be appreciated that stimuli other than the client device input 140 can influence the parameters and object attributes. For example, various timers (such as elapsed time, time since a particular event, virtual time of day, total number of players, a participant's geographic location, etc.) can have an effect on various aspects of the game state, such as player-related parameters and object attributes.

In addition, in step 320A, certain ones of the basic spectator-related parameters 620 or the customizable spectator-related parameters 630 are updated based on the display setting parameter 710 received from client device 120A.

Because information included in the display setting parameter 710 only has an effect on rendering of the screen provided to client device 120A, it is handled separately from the game state. In other words, in this embodiment, to player 500P using client device 120, game screens corresponding to his or her own operation, settings, or the like, are generated and presented. On the other hand, to spectator 500S using client device 120A, screens corresponding to the screens provided to player 500P are provided, but configuration is taken such that in the generation of the screens, a display state of a portion of the rendering objects, for example, can be changed. This is because the possibility is high that a change of the display state made by spectator 500S is not a desirable change to player 500P, and there is the possibility that the game play of player 500P would become difficult due to the change of the display state by spectator 500S being applied to screens provided to player 500P. Accordingly, for each client device 120A in this embodiment, while basically of a similar configuration to the screens provided to client device 120, screens of a display state are provided in which the taste of the user that uses them (player 500P) is reflected. Updating display settings of the customizable spectator-related parameters 630 based on the display setting parameter 710 is illustrated by a dashed arrow in FIG. 8 between the main game process 300A and the participant database 10.

Once the game state has been updated further to execution of step 320A, the main game process 300A returns to step 310A, whereupon new client device input received since the last pass through the main game process is gathered and processed.

Graphics Control Process

In the embodiment, it is recalled that there is a single player 500P and a single spectator 500S. The video game functional module 270 executes a single graphics control process (denoted "300B (player)" in FIG. 8) for the player 500P, causing the generation of a set of rendering commands 804, which are provided to the rendering functional module 280. The graphics control process 300B (player) includes steps 310B, 320B and 330B, which were previously described with reference to FIG. 3B and are now described in the context of the first embodiment of the present invention.

Specifically, at step 310B of the graphics control process 300B (player), the video game functional module 270 determines the objects to be rendered for the player 500P. Step 310B can include identifying those objects from the virtual world that are in the game screen rendering range for the player 500P. Step 310B can also include identifying additional objects that do not appear in the virtual world, but which nevertheless are to be rendered for the player 500P. For example, these additional objects may include textual messages, graphical warnings and dashboard indicators, to name a few non-limiting possibilities.

At step 320B, the video game functional module 270 generates the set of commands 804P for rendering into images the objects that were identified at step 310B. This step takes into account the camera parameters, as well as lighting conditions and various object characteristics.

At step 330B, the set of rendering commands 804P generated at step 320B is output to the rendering functional module 280.

Generation of Graphics Output Stream 206 for Player 500P

A graphics process 820 in the rendering functional module 280 interprets the set of rendering commands 804P and produces a corresponding image stream 805P for the player 500P's client device 120. The images in image stream 805P are encoded by the video encoder 285, resulting in graphics output stream 206, which is sent to the player 500P's client devices 120.

Generation of Graphics Output Stream 206A for Spectator 500S

Within the rendering functional module 280, the set of rendering commands 804P for the player 500P (produced by the graphics control process 300B (player)) can be duplicated and fed to an input of a modifier 810. The modifier 810 modifies the duplicate set of rendering commands 804P based on the display setting. Specifically, the display setting is input to the modifier 810. The modifier 810 modifies one or more of the rendering commands in the duplicate set of rendering commands 804P based on the display setting, resulting in a modified set of rendering commands 804S.

More specifically, the modifier 810 identifies a parameter for which a change occurs by the display setting for spectator 500S in the parameters included in the duplicate set of rendering commands 804P. Then, by the modifier 810 changing the parameter by replacing with a value included in the display setting, the modified set of rendering commands 804S for screens having a display state matching the taste of spectator 500S are generated. Note, explanation is given having the modified set of rendering commands 804S be generated by changing a parameter included in the duplicate set of rendering commands 804P by the display settings in this embodiment, but in cases where the display setting includes something that makes a particular rendering object non-displayed, configuration may be taken such that the modified set of rendering commands 804S is generated by deleting rendering commands of a corresponding portion of the rendering commands from the duplicate set of rendering commands 804P.

The modified set of rendering commands 804S is then processed by a graphics process 830 similar to the graphics process 820, resulting in an image stream 805S for the spectator 500S. The image stream 805S contains a manifestation of the response to the display setting parameter 710, which image stream 805P does not.

The images in image stream 805S are encoded by the video encoder 285, resulting in graphics output stream 206A, which is sent to the spectator 500S's client device 120.

Figure 9:
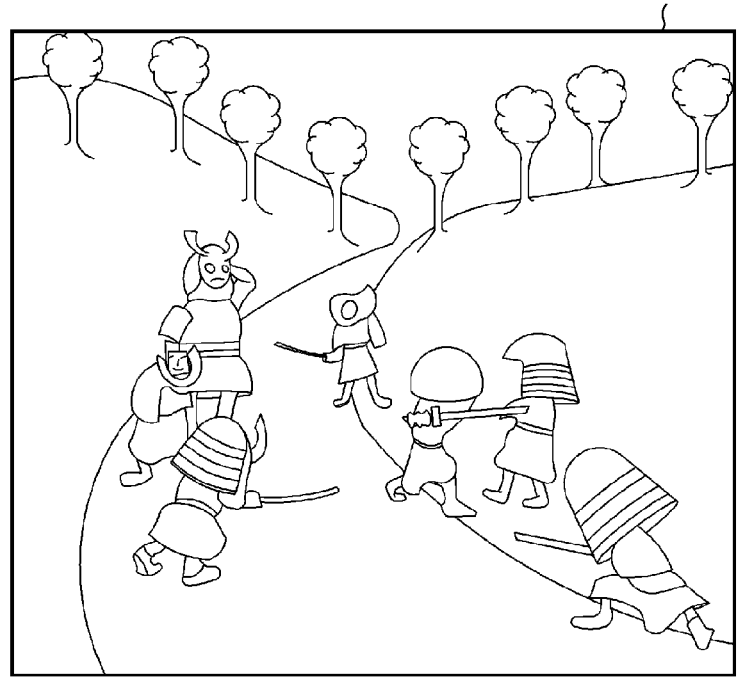
FIG. 9 is a view for showing an example of a game screen provided to a player in embodiments of the present invention.
Figure 10:
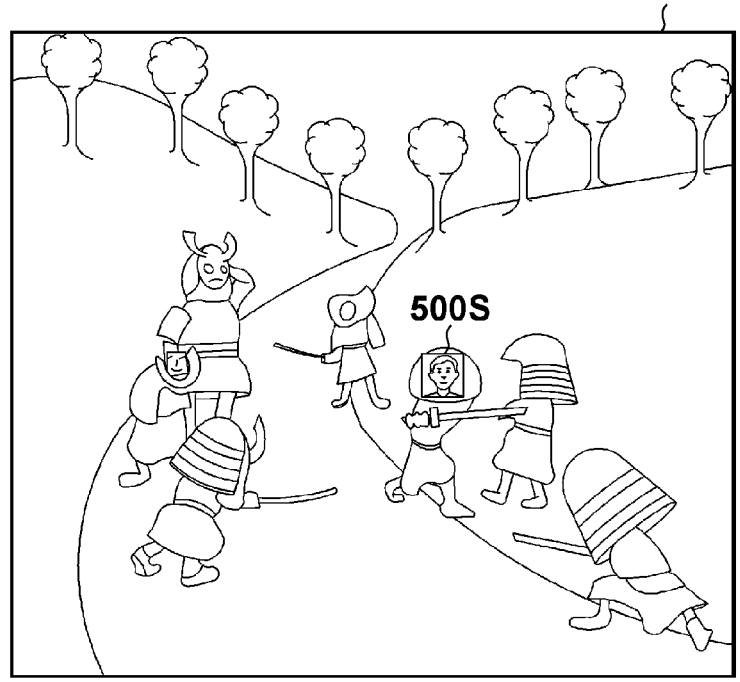
FIG. 10 is a view for showing an example of a game screen provided to a spectator in embodiments of the present invention.

At client device 120, the player 500P observes the images encoded in graphics output 206, while at client device 120A, the spectator 500S observes the images encoded in graphics output stream 206A. FIG. 9 shows an example of what may be seen by the player 500P, while FIG. 10 shows an example of what may be seen by the spectator 500S.

In this way, in the system of the present embodiment, by changing a portion of the parameters to match a display state that the spectator desires by re-using a rendering command generated for screen provision to the player, the desired screens can be provided to the spectator without an effect occurring in the screens of the player.

Variation

Explanation was given for a method of generating rendering commands for screens provided to spectator 500S, who desires to view the same screens, by changing a portion of the commands because the rendering commands for screens provided to player 500P of the client device 120 are generated on the server in the system of the above described embodiment.

Note, in cloud gaming systems, a spectator normally spectates rendered screens for the same viewpoint as the player. However, if a configuration is taken in which rendering commands change in order to change the display state, as in the above described embodiment, generating a screen in which the viewpoint is changed for the spectator is possible. However, considering processing resources and memory resources in cloud gaming systems, it is not realistic to devote equivalent resources for screen provision to the spectator who is not performing game play as to the player. In other words, in cases where a viewpoint change in screen generation for the spectator is allowed, for example, rendering and illumination calculation of objects newly included in the rendering scope due to the viewpoint change becomes necessary. Here, resource usage unrelated to the game play of the player occurs for processing for reading data for an object for which the necessity to newly render occurs, loading it into memory, allocating a memory region necessary for the loading, for illumination calculation, and the like for the generation of the screens for the spectator. In other words, there is the possibility that a resource deficiency will occur due to a viewpoint change being permitted, and an effect being had on the game play of the player in the worst case.

On the other hand, because demand for a viewpoint change by spectators is strong, explanation will be given for a method for recognizing a viewpoint change in screen generation for the spectator while avoiding a large increase of resource usage in the variation.

In the variation, the modifier 810 of FIG. 8 determines whether or not a setting for a viewpoint change is included in the display settings. In cases where the setting for viewpoint change is included, a list of rendering objects determined to be used for rendering identified in step 310B of the graphics control process 300B (player) for client device 120, for example, is obtained. Then, the modifier 810 determines whether or not all of the rendering objects included in the rendering scope are included in the list in cases where a viewpoint change is performed in accordance with the setting. Even if a viewpoint change is made, if the rendering objects used for screen rendering are the same as the rendering objects used for screen rendering for the player, or if they are a portion of those, at least it is not necessary to newly load new rendering object data into memory. Because a change in illuminating conditions, or the like, is unlikely in cases like this where there are few changes in the rendering objects, it can be considered that the need to consider an increase in the calculation amount for illumination calculation is low. Accordingly, the modifier 810 changes a rendering command for a viewpoint setting from the duplicate set of rendering commands 804P only in cases where the rendering objects used for screen rendering after the viewpoint change are all included in the rendering object group used for the rendering of the screen provided to player 500P.

With such a configuration, in the system of the variation, when the spectator spectates the game play of the player, the spectator is able to receive the provision of screens rendered for a desired viewpoint.

Note, in the variation, devoting equivalent resources to the spectator who is not performing game play as to the player for screen provision was assumed to not be realistic, and explanation was given having a restriction added to the scope of viewpoint change that is allowed in screens provided to the spectator, but working of the present invention is not limited to this. In cases where there are abundant resources, there is no need to add a restriction to viewpoint changes.

CONCLUSION

Upon observing the images encoded in graphics output stream 206A, the spectator 500S may have the opportunity to observe changes to the appearance of a rendered object further to the spectator 500S having issued the display setting parameter 710. Due to the perceived difficulty involved in causing such a change of appearance based solely on image post-processing, the spectator 500S may be provided with an increased degree of confidence that the images being viewed represent real-time gameplay.

The confirmation of real-time gameplay may be useful in providing additional convenience and excitement to individual spectators. In some commercial contexts, the confirmation provided by certain embodiments of the present invention may be a useful tool when managing the placement of wagers on the outcome of spectated video games.

Persons skilled in the art should appreciate that the above-discussed embodiments are to be considered illustrative and not restrictive. Also it should be appreciated that additional elements that may be needed for operation of certain embodiments of the present invention may not have been described or illustrated, as they are assumed to be within the purview of the person of ordinary skill in the art. Moreover, certain embodiments of the present invention may be free of, may lack and/or may function without any element that is not specifically disclosed herein.

Those skilled in the art will also appreciate that additional adaptations and modifications of the described embodiments can be made. The scope of the invention, therefore, is not to be limited by the above description of specific embodiments but rather is defined by the claims attached hereto.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. Also, the information processing apparatus and the controlling method thereof according to the present invention are realizable by a program executing the methods on a computer. The program is providable/distributable by being stored on a computer-readable storage medium or through an electronic communication line.

This application claims the benefit of U.S. Provisional Patent Application No. 61/772,690, filed Mar. 5, 2013, which is hereby incorporated by reference herein in its entirety.

The invention claimed is:

1. An information processing apparatus that generates a rendering command for a screen to be provided to a plurality of client devices, the apparatus comprising:
   a network interface which is able to obtain information of an operation input made on a first client device from the first client device; and
   at least one processor which is able to:
      generate a first rendering command for a first screen to be provided to the first client device based on the information of the operation input;
      obtain change information, for changing a display state of a rendering object, from a second client device, a second screen changed based on the information of the operation input being provided to the second client device; and
      generate a second rendering command for the second screen by changing the first rendering command based on the change information.

2. The information processing apparatus according to claim 1, wherein the at least one processor generates the second rendering command by replacing at least a portion of rendering parameters included in the first rendering command with a rendering parameter included in the change information.

3. The information processing apparatus according to claim 1, wherein
   the at least one processor is further able to specify a rendering object group used for generation of a screen, and
   the at least one processor, in a case where the first rendering command is changed based on viewpoint information included in the change information, changes viewpoint information of the first rendering command based on the viewpoint information included in the change information when all of a rendering object group used for a screen generated by that command are included in a rendering object group used for generation of the first screen.

4. A rendering apparatus comprising:
   at least one graphics processor which is able to generate a screen using rendering commands generated by the information processing apparatus according to claim 1;

a second network interface which is able to transmit, to the first client device, the first screen generated based on the first rendering command; and a third network interface which is able to transmit, to the second client device, the second screen generated based on the second rendering command.

5. The rendering apparatus according to claim 4, wherein the at least one graphics processor performs generation of the first screen and generation of the second screen in parallel.

6. A method of controlling an information processing apparatus that generates a rendering command for a screen to be provided to a plurality of client devices, the method comprising:

obtaining information of an operation input made on a first client device from the first client device;

generating a first rendering command for a first screen to be provided to the first client device based on the information of the operation input;

obtaining change information, for changing a display state of a rendering object, from a second client device, a second screen changed based on the information of the operation input being provided to the second client device; and generating a second rendering command for a second screen to be provided to the second client device by changing the first rendering command based on the change information.

7. A non-transitory computer-readable storage medium storing a program for causing one or more computers to execute a method of generating a rendering command for a screen to be provided to a plurality of client devices, the method comprising:

obtaining information of an operation input made on a first client device from the first client device;

generating a first rendering command for a first screen to be provided to the first client device based on the information of the operation input;

obtaining change information, for changing a display state of a rendering object, from a second client device, a second screen changed based on the information of the operation input being provided to the second client device; and generating a second rendering command for a second screen to be provided to the second client device by changing the first rendering command based on the change information.

* * * * *